US007853578B1

(12) United States Patent
Anker et al.

(10) Patent No.: US 7,853,578 B1
(45) Date of Patent: Dec. 14, 2010

(54) HIGH-PERFORMANCE PATTERN MATCHING

(75) Inventors: Tal Anker, Modiin (IL); Yaron Weinsberg, Jerusalem (IL); Shimrit Tzur-David, Jerusalem (IL); Danny Dolev, Jerusalem (IL)

(73) Assignees: Marvell International Ltd., Hamilton (BM); Yissum Research Development Company of The Hebrew University of Jerusalem, Jerusalem (IL)

( * ) Notice: Subject to any disclaimer, the term of this patent is extended or adjusted under 35 U.S.C. 154(b) by 711 days.

(21) Appl. No.: 11/607,116

(22) Filed: Nov. 30, 2006

Related U.S. Application Data

(60) Provisional application No. 60/748,922, filed on Dec. 9, 2005.

(51) Int. Cl.
*G06F 7/00* (2006.01)
*G06F 17/30* (2006.01)
(52) U.S. Cl. ............... 707/706; 707/776; 707/999.006; 711/108
(58) Field of Classification Search ...................... None
See application file for complete search history.

(56) References Cited

U.S. PATENT DOCUMENTS

| 6,081,440 | A * | 6/2000 | Washburn et al. ........ 365/49.17 |
| 6,874,016 | B1 * | 3/2005 | Gai et al. ..................... 709/215 |
| 7,134,143 | B2 * | 11/2006 | Stellenberg et al. ........... 726/25 |
| 7,185,017 | B1 * | 2/2007 | Cauvin et al. ................ 707/101 |
| 7,225,188 | B1 * | 5/2007 | Gai et al. ....................... 707/6 |
| 7,492,763 | B1 * | 2/2009 | Alexander, Jr. ............. 370/389 |
| 7,602,785 | B2 * | 10/2009 | Dharmapurikar et al. ... 370/392 |
| 7,613,822 | B2 * | 11/2009 | Joy et al. ..................... 709/235 |
| 2005/0021491 | A1 * | 1/2005 | Horgan .......................... 707/1 |
| 2007/0115986 | A1 * | 5/2007 | Shankara .................... 370/392 |

OTHER PUBLICATIONS

Tatsuya Akutsu, "Approximate String Matching With Don't Care Characters", Jun. 19, 1995, Informarmation Processing Letters 55 (19950, pp. 235-239.*

Rong-Tai Liu; Nen-Fu Huang; Chih-Hao Chen and Chia-Nan Kao, "A Fast String-Matching Algorithm for Network Processor-Based Intrusion Detection System" ACM Transactions on Embedded Computing Systems, vol. 3, No. 3, Aug. 2004, p. 614-633.*

Long Bu, John A. Chandy, "A Keyword Match Processor Architecture using Content Addressable Memory" GLSVLSI'04, Apr. 26-28, 2004, ACM, pp. 372-376.*

(Continued)

*Primary Examiner*—Mohammad Ali
*Assistant Examiner*—Angelica Ruiz

(57) ABSTRACT

Apparatus having corresponding methods and computer programs, to detect a pattern in a string, comprises a memory circuit to store W-character segments of the pattern, where each segment comprises a fragment of the pattern; a key circuit to generate W-character keys each including a fragment of the string; a comparison circuit to compare the keys and the segments; where, when a segment matches a key, the comparison circuit indicates an initial match between the pattern and the string; and where, when one of the segments matches only a L-character fragment of one of the keys, wherein L<W, the key circuit generates a new key including the L-character fragment and a K-character fragment of the string including K=W–L consecutive characters from the string that are adjacent to the L matching characters in the string.

22 Claims, 11 Drawing Sheets

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE p. 802.20 V 14, Jul. 16, 2004, Draft 802.20 Permanent Document, System Requirements for IEEE 802.20 Mobile Broadband Wireless Access Systems—Version 14, 23 pages.

A Network Intrusion Prevention System (NIPS) for High-Speed Networks; by Shimrit Tzur-David; Sep. 2005; 89 pages.

A taxonomy of keyword pattern matching algorithms; by B.W. Watson and G. Zwaan; Computing Science Note 92/27; Eindhoven, Dec. 1992; 51 pages.

A Fast Generic Sequence Matching Algorithm; by David R. Musser and Gor V. Nishanov; Feb. 2, 2001; 64 pages.

A Fast String Searching Algorithm; by Robert S. Boyer (Stanford Research Institute) and J. Strother Moore; (Xerox Palo Research Center); Copyright 1977; pp. 762-772.

* cited by examiner

HIGH-PERFORMANCE PATTERN MATCHING

CROSS-REFERENCE TO RELATED APPLICATIONS

This application claims the benefit of U.S. Provisional Patent Application Ser. No. 60/748,922 filed Dec. 9, 2005, the disclosure thereof incorporated by reference herein in its entirety.

BACKGROUND

The present invention relates generally to pattern matching. More particularly, the present invention relates to high-performance pattern matching.

Intrusion Detection systems (IDS) were developed to identify and report attacks in the late 1990s, as hacker attacks and network worms began to affect the Internet. But while traditional IDS technologies detect hostile traffic and send alerts, they do nothing to stop the attacks.

As a result, Network Intrusion Prevention Systems (NIPS) were developed. NIPS are deployed in-line with the network segment being protected. As traffic passes through the NIPS, it is inspected for the presence of an attack. Like viruses, most intruder activities have some sort of signature. Therefore, a pattern-matching module resides at the heart of the NIPS. When an attack is identified, the NIPS blocks the offending data. There is an alleged trade-off between the accuracy of detection and the efficiency of the pattern-matching module. Both are paramount in ensuring that legitimate traffic is not delayed or disrupted as it flows through the device. For this reason, the pattern-matching module must be able to operate at wire speed, while simultaneously detecting the main bulk of intrusions. With networking speeds doubling every year, it is becoming increasingly difficult for software-based solutions to keep up with the line rates.

SUMMARY

In general, in one aspect, the invention features an apparatus for detecting a pattern in a string, wherein the pattern and the string each comprise one or more characters selected from a finite set of the characters, wherein the string is N characters in length and the pattern is M characters in length, wherein N>M, the apparatus comprising: a ternary content-addressable memory (TCAM) comprising a first plurality of rows each storing a segment comprising W−S consecutive ones of the characters in the pattern preceded by S don't-care characters, wherein $0 \leq S \leq W$; a random-access memory to store the value of S for each of the rows of the TCAM; and a controller to generate keys based on the string, wherein each of the keys includes the consecutive ones of the N characters in a window of W characters of the string, and to apply the keys to the TCAM; wherein, when the TCAM returns a matching row having a shift of S>0 in response to one of the keys, the controller shifts the window S places to the right and generates a new key including the consecutive ones of the N characters in the shifted window; and wherein, when the TCAM returns a matching row having a shift of S=0, the controller declares an initial match between the pattern and the string.

In some embodiments, the TCAM further comprises: a second row following the plurality of first rows, wherein the second row stores W don't-care characters; and wherein the random-access memory stores the value S=W for the second row of the TCAM. In some embodiments, the controller, after declaring an initial match between the pattern and the string, declares a complete match between the pattern and the string when $N \leq W$. In some embodiments, after the controller declares an initial match between the pattern and the string, and when N>W, (a) the controller shifts the window W places to the right and generates a new key including the consecutive ones of the N characters in the shifted window, (b) the controller applies the new key to the TCAM, (c) wherein, when the TCAM returns a matching row having a shift of S>0, the controller declares no match between the pattern and the string, (d) wherein, when the TCAM returns a matching row having a shift of S=0, the controller repeats (a) through (d) until all of the M characters of the pattern have been applied to the TCAM, and (e) when all of the keys in (a) through (d) returns a shift of S=0, the controller declares a complete match between the pattern and the string. In some embodiments, the TCAM stores segments associated with at least one further pattern; the random-access memory stores an association between each row of the TCAM and an identifier of the pattern associated with the segment stored in that row of the TCAM; and the controller declares the identifier for the pattern when declaring an initial match between the pattern and the string. In some embodiments, when the pattern comprises a constraint that identifies one or more portions of the string, the controller declares an initial match between the pattern and the string only when the pattern is found in the one or more portions of the string. In some embodiments, when one of the segments for the pattern comprises one or more second patterns, the random-access memory stores an association between the row of the TCAM storing the one of the segments and identifiers of the one or more second patterns; and, when the controller declares an initial match between the pattern and the string, the controller declares an initial match between the second pattern and the string. Some embodiments comprise an input circuit to receive packets of data, wherein the string represents some or all of the data. Some embodiments comprise an alert circuit to declare an attack when the controller indicates a complete match between the pattern and the string. Some embodiments comprise a drop circuit to drop one or more of the packets when the controller indicates a complete match between the pattern and the string. Some embodiments comprise a network device comprising the apparatus. In some embodiments, the network device is selected from the group consisting of a network switch; a router; and a network interface controller.

In general, in one aspect, the invention features an apparatus for detecting a pattern in a string, wherein the pattern and the string each comprise one or more characters selected from a finite set of the characters, wherein the string is N characters in length and the pattern is M characters in length, wherein N>M, the apparatus comprising: ternary content-addressable memory (TCAM) means comprising a first plurality of row means each for storing a segment comprising W−S consecutive ones of the characters in the pattern preceded by S don't-care characters, wherein $0 \leq S \leq W$; random-access memory means for storing the value of S for each of the row means of the TCAM means; and controller means for generating keys based on the string, wherein each of the keys includes the consecutive ones of the N characters in a window of W characters of the string, and for applying the keys to the TCAM means; wherein, when the TCAM means returns a matching row means having a shift of S>0 in response to one of the keys, the controller means shifts the window S places to the right and generates a new key including the consecutive ones of the N characters in the shifted window; and wherein, when the TCAM means returns a matching row means having a shift of S=0, the controller means declares an initial match between the pattern and the string.

In some embodiments, the TCAM means further comprises: second row means, following the plurality of first row means, for storing W don't-care characters; and wherein the random-access memory means stores the value S=W for the second row means of the TCAM means. In some embodiments, the controller means, after declaring an initial match between the pattern and the string, declares a complete match between the pattern and the string when $N \leq W$. In some embodiments, after the controller means declares an initial match between the pattern and the string, and when N>W, (a) the controller means shifts the window W places to the right and generates a new key including the consecutive ones of the N characters in the shifted window, (b) the controller means applies the new key to the TCAM means, (c) wherein, when the TCAM means returns a matching row means having a shift of S>0, the controller means declares no match between the pattern and the string, (d) wherein, when the TCAM means returns a matching row means having a shift of S=0, the controller means repeats (a) through (d) until all of the M characters of the pattern have been applied to the TCAM means, and (e) when all of the keys in (a) through (d) returns a shift of S=0, the controller means declares a complete match between the pattern and the string, In some embodiments, the TCAM means stores segments associated with at least one further pattern; the random-access memory means stores an association between each row means of the TCAM means and an identifier of the pattern associated with the segment stored in that row means of the TCAM means; and the controller means declares the identifier for the pattern when declaring an initial match between the pattern and the string. In some embodiments, when the pattern comprises a constraint that identifies one or more portions of the string, the controller means declares an initial match between the pattern and the string only when the pattern is found in the one or more portions of the string. In some embodiments, when one of the segments for the pattern comprises one or more second patterns, the random-access memory means stores an association between the row means of the TCAM means storing the one of the segments and identifiers of the one or more second patterns; and wherein, when the controller means declares an initial match between the pattern and the string, the controller means declares an initial match between the second pattern and the string. Some embodiments comprise input means for receiving packets of data, wherein the string represents some or all of the data. Some embodiments comprise alert means for declaring an attack when the controller means indicates a complete match between the pattern and the string. Some embodiments comprise drop means for dropping one or more of the packets when the controller means indicates a complete match between the pattern and the string. Some embodiments comprise network device comprising the apparatus. In some embodiments, the network device is selected from the group consisting of: a network switch; a router; and a network interface controller.

In general, in one aspect, the invention features an apparatus to detect a pattern in a string, wherein the pattern and the string each comprise one or more characters selected from a finite set of the characters, wherein the string is N characters in length and the pattern is M characters in length, and wherein N>M, the apparatus comprising: a memory circuit to store one or more W-character segments of the pattern, wherein each segment comprises a fragment of the pattern; a key circuit to generate one or more W-character keys each including a fragment of the string; a comparison circuit to compare the keys and the segments; wherein, when one of the segments matches one of the keys, the comparison circuit indicates an initial match between the pattern and the string; and wherein, when one of the segments matches only a L-character fragment of one of the keys, wherein L<W, the key circuit generates a new one of the keys including the L-character fragment and a K-character fragment of the string including K=W−L consecutive characters from the string that are adjacent to the L matching characters in the string.

In some embodiments, the comparison circuit compares the new one of the keys and the segments; wherein, when one of the segments matches the new one of the keys, the comparison circuit indicates an initial match between the pattern and the string; and wherein, when one of the segments matches only J of the characters in the new one of the keys, wherein J<W, the key circuit generates a further new one of the keys including the J matching characters of the string and W−J consecutive characters from the string that are adjacent to the J matching characters in the string. Some embodiments comprise an input circuit to receive packets of data, wherein the string represents some or all of the data. Some embodiments comprise an alert circuit to declare an attack when the comparison circuit indicates an initial match between the pattern and the string. Some embodiments comprise a drop circuit to drop one or more of the packets when the comparison circuit indicates an initial match between the pattern and the string. Some embodiments comprise a network device comprising the apparatus. In some embodiments, the network device is selected from the group consisting of: a network switch; a router; and a network interface controller.

In general, in one aspect, the invention features an apparatus to detect a pattern in a string, wherein the pattern and the string each comprise one or more characters selected from a finite set of the characters, wherein the string is N characters in length and the pattern is M characters in length, and wherein $N \geq M$, the apparatus comprising: memory means for storing one or more W-character segments of the pattern, wherein each segment comprises a fragment of the pattern; key means for generating one or more W-character keys each including a fragment of the string; comparison means for comparing the keys and the segments; wherein, when one of the segments matches one of the keys, the comparison means indicates an initial match between the pattern and the string; and wherein, when one of the segments matches only a L-character fragment of one of the keys, wherein L<W, the key means generates a new one of the keys including the L-character fragment and a K-character fragment of the string including K=W−L consecutive characters from the string that are adjacent to the L matching characters in the string.

In some embodiments, the comparison means compares the new one of the keys and the segments; wherein, when one of the segments matches the new one of the keys, the comparison means indicates an initial match between the pattern and the string; and wherein, when one of the segments matches only J of the characters in the new one of the keys, wherein J<W, the key means generates a further new one of the keys including the J matching characters of the string and W−J consecutive characters from the string that are adjacent to the J matching characters in the string. Some embodiments comprise input means for receiving packets of data, wherein the string represents some or all of the data. Some embodiments comprise alert means for declaring an attack when the comparison means indicates an initial match between the pattern and the string. Some embodiments comprise drop means for dropping one or more of the packets when the comparison means indicates an initial match between the pattern and the string. Some embodiments comprise a network device comprising the apparatus. In some embodiments, the network device is selected from the group consisting of: a network switch; a router; and a network interface controller.

In general, in one aspect, the invention features a method to detect a pattern in a string, wherein the pattern and the string each comprise one or more characters selected from a finite set of the characters, wherein the string is N characters in length and the pattern is M characters in length, and wherein $N \geq M$, the method comprising: storing one or more W-character segments of the pattern, wherein each segment comprises a fragment of the pattern; generating one or more W-character keys each including a fragment of the string; comparing the keys and the segments; indicating an initial match between the pattern and the string when one of the segments matches one of the keys; and when one of the segments matches only a L-character fragment of one of the keys, wherein $L<W$, generating a new one of the keys including the L-character fragment and a K-character fragment of the string including $K=W-L$ consecutive characters from the string that are adjacent to the L matching characters in the string.

Some embodiments comprise comparing the new one of the keys and the segments; indicating an initial match between the pattern and the string when one of the segments matches the new one of the keys; and when one of the segments matches only J of the characters in the new one of the keys, wherein $J<W$, generating a further new one of the keys including the J matching characters of the string and W–J consecutive characters from the string that are adjacent to the J matching characters in the string. Some embodiments comprise receiving packets of data, wherein the string represents some or all of the data. Some embodiments comprise declaring an attack upon indicating an initial match between the pattern and the string. Some embodiments comprise dropping one or more of the packets on indicating an initial match between the pattern and the string.

In general, in one aspect, the invention features a computer program, executable on a processor, to detect a pattern in a string, wherein the pattern and the string each comprise one or more characters selected from a finite set of the characters, wherein the string is N characters in length and the pattern is M characters in length, and wherein $N \geq M$, the computer program comprising: instructions for storing one or more W-character segments of the pattern, wherein each segment comprises a fragment of the pattern; instructions for generating one or more W-character keys each including a fragment of the string; instructions for comparing the keys and the segments; instructions for indicating an initial match between the pattern and the string when one of the segments matches one of the keys; and instructions for, when one of the segments matches only a L-character fragment of one of the keys, wherein $L<W$, generating a new one of the keys including the L-character fragment and a K-character fragment of the string including $K=W-L$ consecutive characters from the string that are adjacent to the L matching characters in the string.

Some embodiments comprise instructions for comparing the new one of the keys and the segments; instructions for indicating an initial match between the pattern and the string when one of the segments matches the new one of the keys; and instructions for, when one of the segments matches only J of the characters in the new one of the keys, wherein $J<W$, generating a further new one of the keys including the J matching characters of the string and W–J consecutive characters from the string that are adjacent to the J matching characters in the string. Some embodiments comprise instructions for receiving packets of data, wherein the string represents some or all of the data. Some embodiments comprise instructions for declaring an attack upon indicating an initial match between the pattern and the string. Some embodiments comprise instructions for dropping one or more of the packets on indicating an initial match between the pattern and the string.

In general, in one aspect, the invention features a method for populating a TCAM with a pattern comprising N characters, wherein each row of the TCAM can store a segment comprising W of the characters, the method comprising: when $N=W$, storing a segment comprising the pattern in a row of the TCAM; when $N<W$, generating a segment comprising the N characters of the pattern followed by W–N don't-care characters, and storing the segment in a row of the TCAM; when $N>W$, generating $R=\text{Ceiling}(N/W)$ segments based on the pattern, and storing each of the segments in a row of the TCAM, comprising placing characters $(I-1)W+1$ through $IW$ of the pattern in the Ith one of the segments, wherein $I=1$ through $R-1$, and placing the last W characters of the pattern in the last of the R segments; and storing W–1 variants of each of the segments in subsequent rows of the TCAM, comprising, for each of the segments, for W–1 cycles, shifting the segment to the right by one character, inserting a don't-care character as the first character of the segment, and storing the resulting segment in a row of the TCAM.

Some embodiments comprise ensuring no two or more rows of the TCAM store the same data. Some embodiments comprise a TCAM populated according to the method.

In general, in one aspect, the invention features a computer program, executable on a processor, for populating a TCAM with a pattern comprising N characters, wherein each row of the TCAM can store a segment comprising W of the characters, the computer program comprising: instructions for, when $N=W$, storing a segment comprising the pattern in a row of the TCAM; instructions for, when $N<W$, generating a segment comprising the N characters of the pattern followed by W–N don't-care characters, and storing the segment in a row of the TCAM; instructions for, when $N>W$, generating $R=\text{Ceiling}(WW)$ segments based on the pattern, and storing each of the segments in a row of the TCAM, comprising instructions for placing characters $(I-1)W+1$ through $IW$ of the pattern in the Ith one of the segments, wherein $I=1$ through $R-1$, and instructions for placing the last W characters of the pattern in the last of the R segments; and instructions for storing W–1 variants of each of the segments in subsequent rows of the TCAM, comprising, for each of the segments, for W–1 cycles, shifting the segment to the right by one character, inserting a don't-care character as the first character of the segment, and storing the resulting segment in a row of the TCAM.

Some embodiments comprise instructions for ensuring no two or more rows of the TCAM store the same data. Some embodiments comprise a TCAM populated according to the computer program.

The details of one or more implementations are set forth in the accompanying drawings and the description below. Other features will be apparent from the description and drawings, and from the claims.

Figure 1:
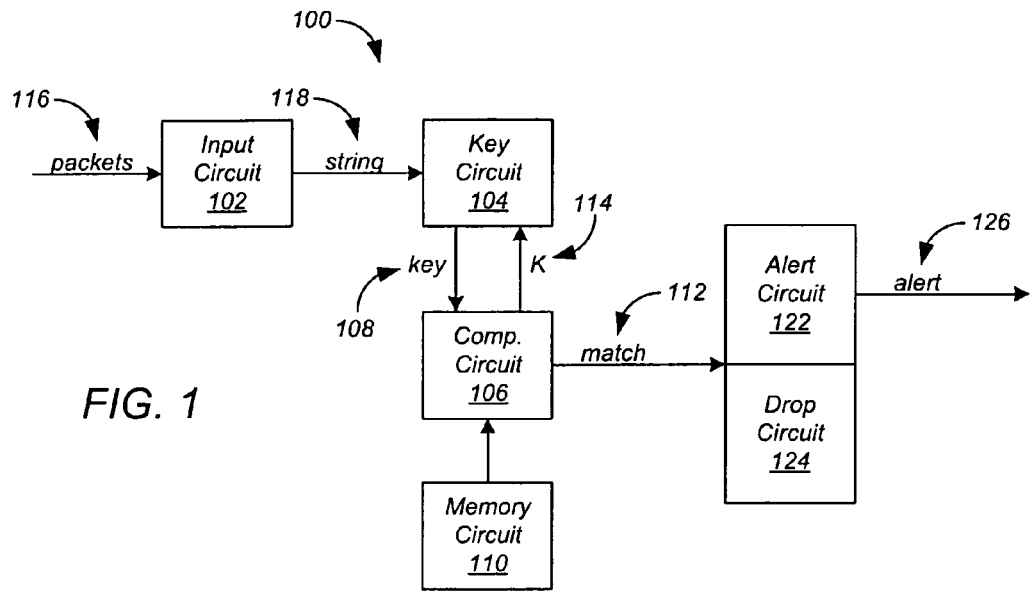
FIG. 1 shows a pattern-matching apparatus according to a preferred embodiment of the present invention.

The leading digit(s) of each reference numeral used in this specification indicates the number of the drawing in which the reference numeral first appears.

DETAILED DESCRIPTION

Embodiments of the present invention provide high-performance pattern-matching capable of matching multiple patterns in a single operation. When used in data communications networks, embodiments of the present invention provide line-rate speed several orders of magnitude faster than conventional solutions, while attaining a similar accuracy of detection. Embodiments of the present invention are fully compatible with Snort's rules syntax [Sno], which is the de facto standard for network intrusion prevention systems (NIPS). However, while embodiments of the present invention are discussed in terms of matching patterns with strings contained in packets of data, for example in NIPS systems, embodiments of the present invention can be employed in any pattern-matching system.

FIG. 1 shows a pattern-matching apparatus 100 according to a preferred embodiment of the present invention. Pattern-matching apparatus 100 detects a pattern in a string. The pattern and the string each include one or more characters selected from a finite set of the characters. The string is N characters in length and the pattern is M characters in length, where $N \geq M$. Pattern-matching apparatus 100 can be implemented as a network device such as a switch, router, network interface controller (NIC), and the like. When implemented as a wireless device, pattern-matching apparatus 100 is preferably compliant with at least one of IEEE standards 802.11, 802.11a, 802.11b, 802.11g, 802.11n, 802.16, and 802.20.

Pattern-matching apparatus 100 comprises an input circuit 102, a key circuit 104, a comparison circuit 106, and a memory circuit 110. In some embodiments, pattern-matching apparatus 100 also comprises an alert circuit 122 and a drop circuit 124. Memory circuit 110 stores one or more W-character segments (that is, segments that are each W characters in length) of one or more of the patterns. Each segment comprises one or more consecutive characters from one of the patterns. Input circuit 102 receives packets of data 116, and generates one or more strings 118 each representing some or all of the data. Key circuit 104 generates keys 108 based on strings 118. Comparison circuit 106 compares keys 108 with the segments stored in memory circuit 110, and can produce a match signal 112 or a feedback value (K) 114 based on the comparison.

Figure 2:
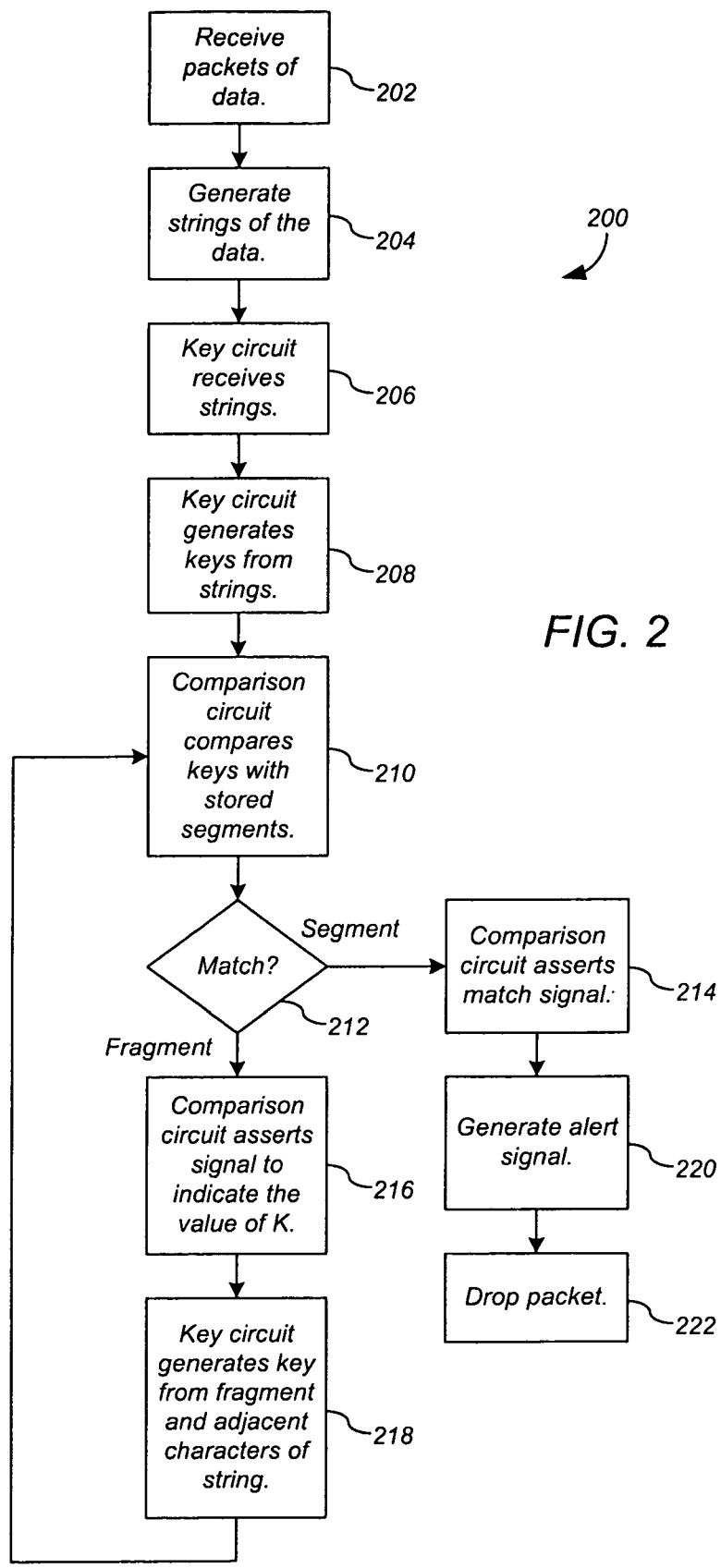
FIG. 2 shows a process for the pattern-matching apparatus of FIG. 1 according to a preferred embodiment of the present invention.

FIG. 2 shows a process 200 for pattern-matching apparatus 100 of FIG. 1 according to a preferred embodiment of the present invention. Input circuit 102 receives packets of data 116 (step 202), and generates one or more strings 118 each representing some or all of the data (step 204). Key circuit 104 receives each string 118 (step 206), and generates one or more W-character keys 108 (that is, keys 108 that are each W characters in length) each including a fragment of a string 118 (step 208).

Comparison circuit 106 compares each key 108 with the segments stored in memory circuit 110 (step 210). When one of the segments matches one of the keys 108 (step 212), comparison circuit 106 asserts match signal 112 to indicate an initial match between the pattern and string 118 (step 214). Recall that each segment comprises one or more consecutive characters from one of the patterns. Therefore, an initial match indicates that the pattern has a partial or complete match in a string 118. In some embodiments, alert circuit 122 generates an alert signal 126 in response to match signal 112 (step 220). In some embodiments, drop circuit 124 drops the corresponding packet 116 in response to match signal 112 (step 222).

However, when one of the segments matches only a L-character fragment (that is, a fragment that is L characters in length) of one of the keys, where L<W, comparison circuit 106 asserts signal 114 to indicate the value of K, where $K=W-L$ (step 216). In response, key circuit 104 generates a new key 108 including the L-character fragment and a K-character fragment (that is, a fragment that is K characters in length) of string 118. The K-character fragment includes K consecutive characters from string 118 that are adjacent to the L matching characters in string 118 (step 218). Comparison circuit 106 then compares new key 108 with the segments stored in memory circuit 110 (resuming at step 210).

Figure 3:
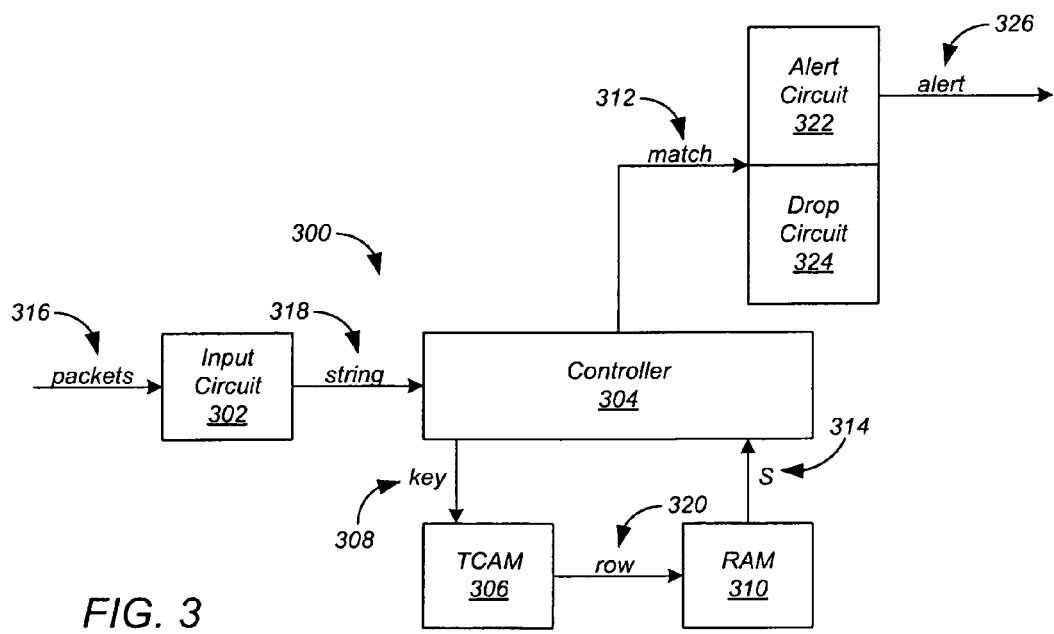
FIG. 3 shows a pattern-matching apparatus employing a ternary content-addressable memory (TCAM) according to a preferred embodiment of the present invention.

FIG. 3 shows a pattern-matching apparatus 300 employing a ternary content-addressable memory (TCAM) according to a preferred embodiment of the present invention. Pattern-matching apparatus 300 detects a pattern in a string. The pattern and the string each comprise one or more characters selected from a finite set of the characters. The string is N characters in length and the pattern is M characters in length, where $N \geq M$. Pattern-matching apparatus 300 can be implemented as a network device such as a switch, router, network interface controller (NIC), and the like. When implemented as a wireless device, pattern-matching apparatus 300 is preferably compliant with at least one of IEEE standards 802.11, 802.11a, 802.11b, 802.11g, 802.11n, 802.16, and 802.20.

Pattern-matching apparatus 300 comprises an input circuit 302, a controller 304, a TCAM 306, and a random-access memory (RAM) 310. In some embodiments, pattern-matching apparatus 300 also comprises an alert circuit 322 and a drop circuit 324. TCAM 306 stores one or more W-character segments of the pattern. Input circuit 302 receives packets of data 316, and generates one or more strings 318 each representing some or all of the data. Controller 304 generates keys 308 based on strings 318, and applies keys 308 to TCAM 306, which provides a signal 320 to RAM 310 representing the first matching row of TCAM 306. RAM 310 provides a shift value (S) 314 to controller 304, which can declare an initial match between a string 318 and the pattern.

For each pattern, TCAM 306 comprises a set of first rows each storing a segment comprising W−S consecutive ones of the characters in the pattern preceded by S don't-care characters, where 0≦S<W, and a second row following the set of first rows, where the second row stores W don't-care characters. RAM 310 stores the value of S for each of the rows of TCAM 306. Controller 304 generates keys 308 based on strings 318, and applies keys 308 to TCAM 306. Each of keys 308 includes the consecutive ones of the N characters in a window of W characters of one of strings 318.

Figure 4:
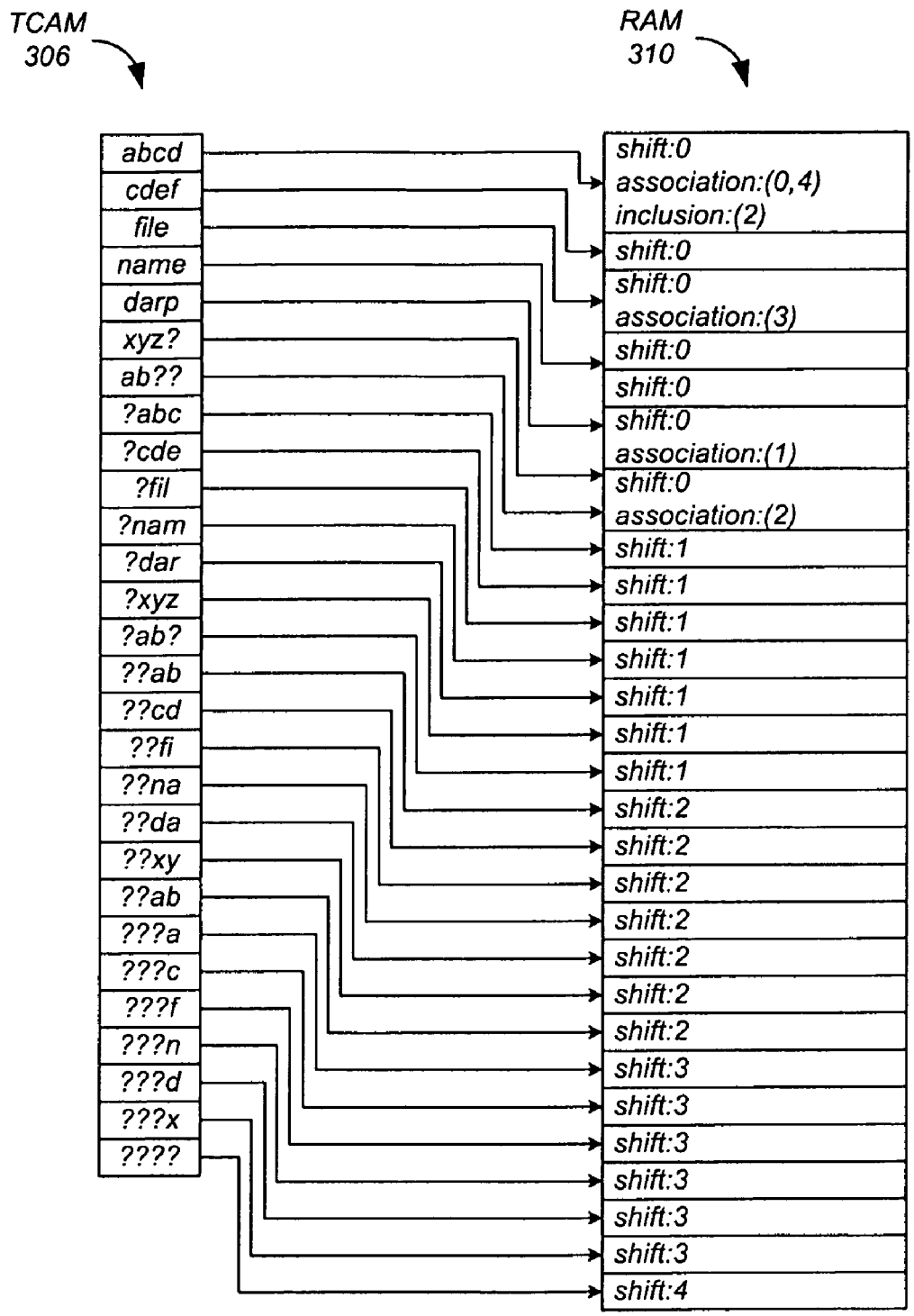
FIG. 4 shows the contents of a TCAM and RAM, where the TCAM is four characters wide, for matching a string having a value "wwabcdeftxyzabcdarp" with five patterns "abcdef", "xyz", "ab", "filename", and "abcdarp".

FIG. 4 shows the contents of a TCAM 306 and a RAM 310, where the TCAM 306 is four characters wide (W=4), for matching a string having a value "wwabcdeftxyzabcdarp" with five patterns "abcdef", "xyz", "ab", "filename", and "abcdarp". In some embodiments, RAM 310 also stores a pattern list comprising a table of the patterns, and stores additional information for each pattern, for example, information concerning the pattern that has been extracted from matching rules such as Snort rules. For example, consider the following rules for the example of FIG. 4:

Rule 0: content:"abcdef"; content:"xyz"; within:5;
Rule 1: content:"ab"; offset:8; content:"filename"; distance:3; within:15;
Rule 2: content:"abcdarp"; depth:25;

Rule 0 indicates that the patterns "abcdef" and "xyz" must occur within 5 characters of each other. Rule 1 indicates that the pattern "ab" must occur after the $8^{th}$ character of the string, and that the pattern "filename" must occur between 3 and 15 characters after the pattern "ab". Rule 2 indicates that the pattern "abcdarp" must occur within the first 25 characters of the string. Table 1 shows the contents of the pattern list for the example of FIG. 4 according to a preferred embodiment of the present invention.

TABLE 1

| Pattern 0 | pattern 1 | pattern 2 | pattern 3 | pattern 4 |
|---|---|---|---|---|
| "abcdef" | "xyz" | "ab" | "filename" | "abcdarp" |
| len = 6 | len = 3 | len = 2 | len = 8 | len = 7 |
| next | next = null | next | next = null | next = null |
| root = true | root = false | root = true | root = false | root = true |
| offset = −1 | offset = −1 | offset = 8 | offset = −1 | offset = −1 |
| depth = −1 | depth = −1 | depth = −1 | depth = −1 | depth = 25 |
| distance = −1 | distance = −1 | distance = −1 | distance = 3 | distance = −1 |
| within = −1 | within = 5 | within = −1 | within = 15 | within = −1 |
| TPtrs = 0,1 | TPtrs = −1 | TPtrs = −1 | TPtrs = 4,5 | TPtrs = 0,6 |

In the pattern list, each pattern is identified by a numeric identifier. Referring to Table 1, the patterns "abcdef", "xyz", "ab", "filename", and "abcdarp" are identified as patterns 0-4, respectively. The entry for each pattern lists the characters in the pattern, the length (len) of the pattern, whether the pattern is the root of a rule (that is, the first pattern in a rule), and the offset for the pattern, if any, which indicates the starting point in a string 318 for pattern matching. Each entry can list the distance for the pattern, if any, which indicates the minimum number of characters allowed between two successive matches. Each entry can list a "within" value, if any, which indicates the maximum number of characters allowed between two successive pattern matches. Each entry can list the depth, if any, which indicates how far into the string the algorithm should search for the pattern. Each entry also lists pointers TPtrs to the rows in TCAM 306 that store segments from the pattern when the length of the pattern exceeds the width W of TCAM 306. Null values are indicated by "null" or "−1".

Figure 5:
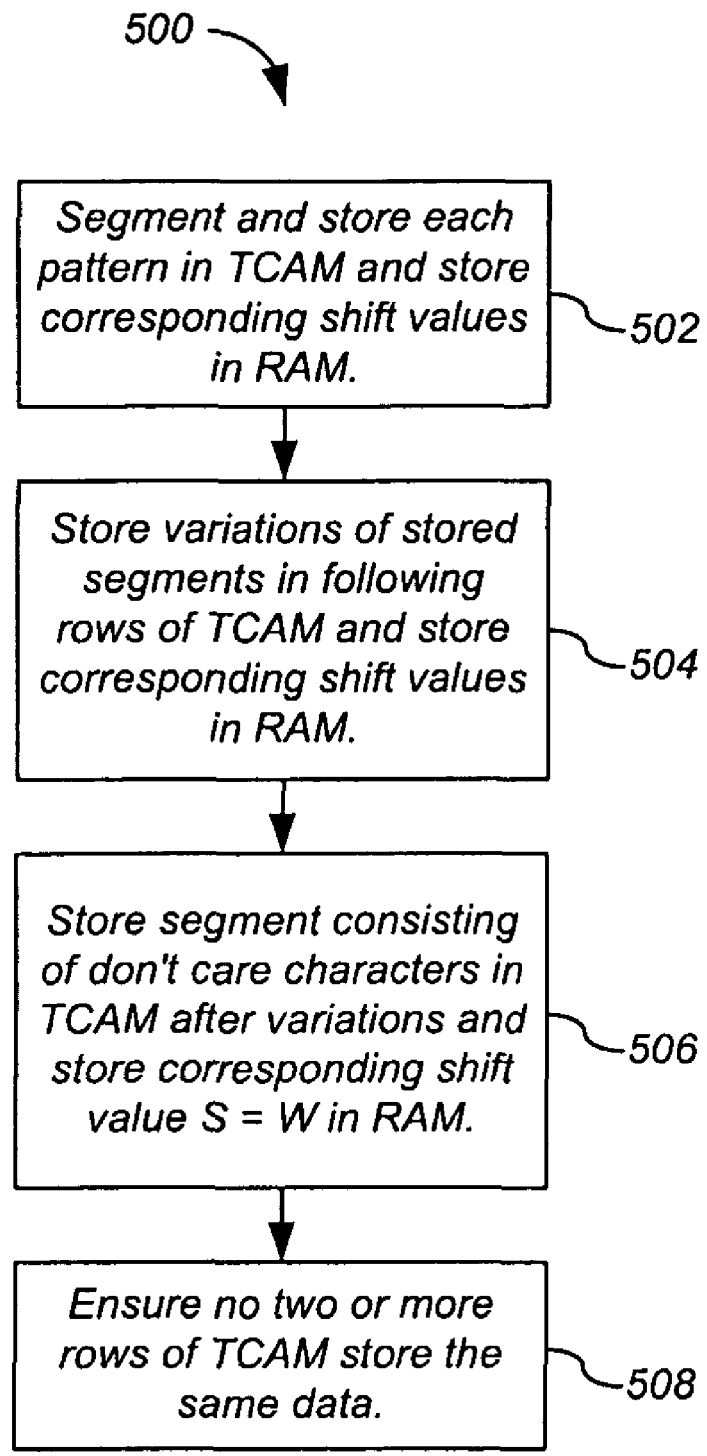
FIG. 5 shows a process for populating the TCAM of FIG. 3 according to a preferred embodiment of the present invention.

FIG. 5 shows a process 500 for populating TCAM 306 according to a preferred embodiment of the present invention. While process 500 is described with respect to the example of FIG. 4, process 500 is not limited by the example. For example, the width W of TCAM 306 can differ from the example. According to process 500, TCAM 306 is populated starting with the first row and then proceeding row by row. Referring to FIG. 4, the top row in TCAM 306 is the first row.

Each pattern is segmented and stored in TCAM 306, and corresponding shift values S are stored in RAM 310 (step 502), as described in detail below with reference to FIG. 6. Variations of the stored segments are stored in the following rows of TCAM 306, and corresponding shift values S are stored in RAM 310 (step 504), as described in detail below with reference to FIG. 7. A segment including don't-care characters is stored in TCAM 306 after the variations, and a shift value of S=W is stored in the corresponding row of RAM 310 (step 506). In the example of FIG. 4, W=4, so the segment "????" is stored in the last row shown for TCAM 306, and a shift value of S=4 is stored in the corresponding row of RAM 310. In some embodiments, the segments are stored in TCAM 306 according to the number of don't-care characters in the segments. For example, referring to FIG. 4, the segments are stored in order of increasing numbers of don't-care characters. In some embodiments, process 500 goes on to ensure no two or more rows of the TCAM store the same data (step 508).

Figure 6:
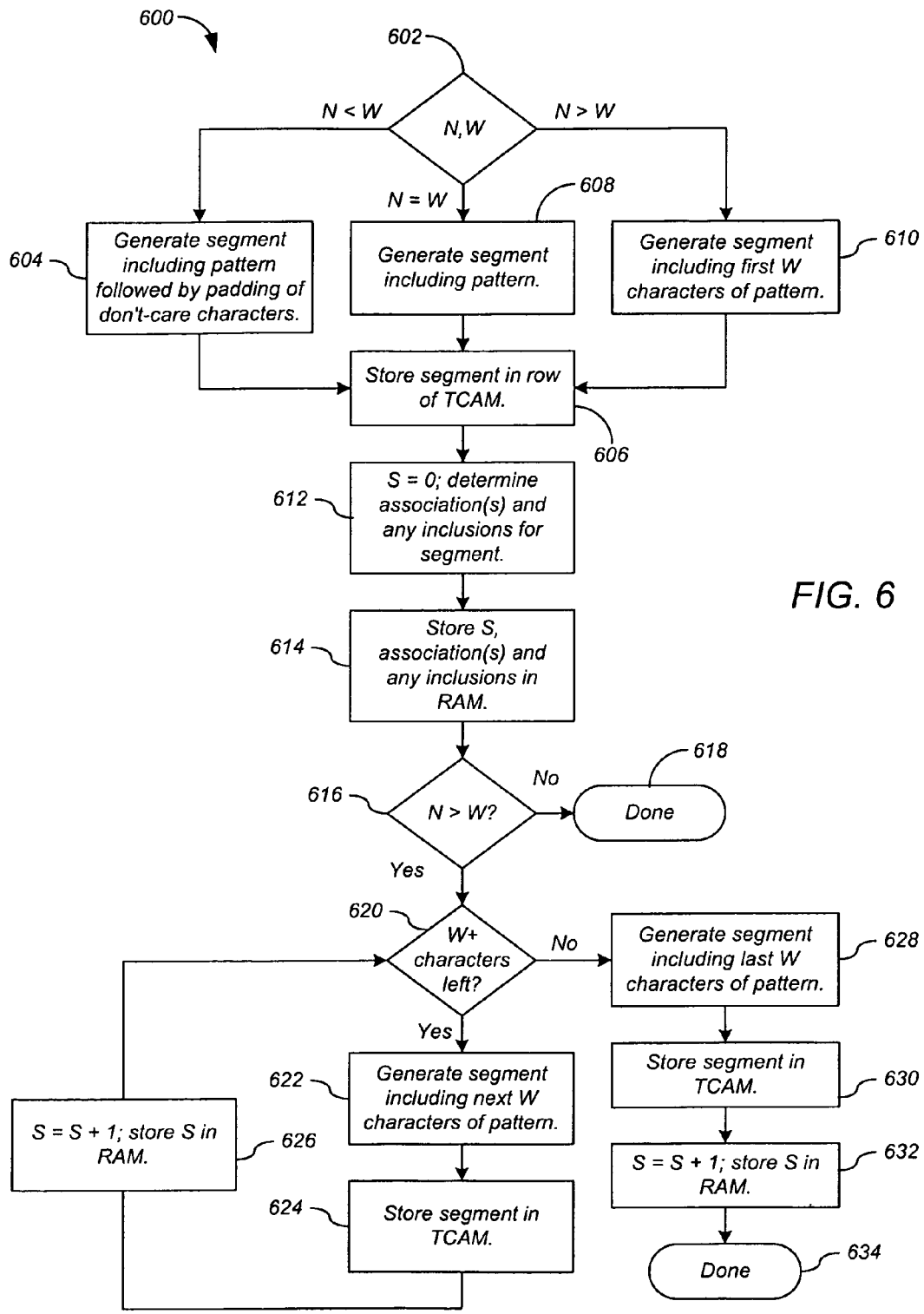
FIG. 6 shows a process for generating segments of a pattern and storing the segments in the TCAM of FIG. 3 according to a preferred embodiment of the present invention.

FIG. 6 shows a process 600 for generating segments of a pattern and storing the segments in TCAM 306 according to a preferred embodiment of the present invention. While process 600 is described with respect to the example of FIG. 4, process 600 is not limited by the example. Process 600 begins by comparing the length N of the pattern to the width W of TCAM 306 (step 602).

If the length N of the pattern is less than the width W of TCAM 306, process 600 generates a segment comprising the pattern followed by a padding of don't-care characters (step 604), and stores the segment in a row of TCAM 306 (step 606). In the example of FIG. 4, for the pattern "xyz", process 600 stores the segment "xyz?", and for the pattern "ab", process 600 stores the segment "ab??", as shown in FIG. 4 at rows six and seven of TCAM 306, respectively.

When the length N of the pattern is the same as the width W of TCAM 306 (returning to step 602), process 600 generates a segment including the entire pattern (step 608), and stores the segment in a row of TCAM 306 (step 606).

When the length N of the pattern is greater than the width W of TCAM 306 (returning to step 602), process 600 breaks the pattern into multiple segments. That is, process 600 generates R=Ceiling(N/W) segments based on the pattern, and stores each of the segments in a different row of TCAM 306, comprising placing characters (I−1)W+1 through 1W of the pattern in the Ith one of the segments, where I=1 through R−1, and placing the last W characters of the pattern in the last of the R segments.

In particular, process 600 generates a first segment including the first W characters of the pattern (step 610), and stores the segment in a row of TCAM 306 (step 606). For example, for the pattern "abcdef", process 600 stores the segment "abcd", and for the pattern "filename", process 600 stores the segment "file", as shown in FIG. 4 at rows one and three of TCAM 306, respectively.

Regardless of how the segment is generated (step 604, 608, or 610), after storing the segment (step 606), process 600 sets the shift value S=0, and determines the association(s) and any inclusions for the segment (step 612). An association is a pattern that includes the segment. Of course, each segment is associated with the pattern from which it was taken. For example, the segments "abcd", "file", "xyz", and "ab??" are associated with patterns 0, 3, 1, and 2, respectively, as shown in FIG. 4 at rows 1, 3, 6 and 7, respectively. But each segment may also be associated with other patterns. For example, the segment "abed" is also associated with pattern 4 ("abcdarp"), as shown in the first row of FIG. 4 ("association:(0,4)").

An inclusion is a pattern that is completely contained in a segment. For example, the segment "abed" contains pattern 2 ("ab"), as shown in the first row of FIG. 4 ("inclusion:(2)"). Process 600 stores the shift value S, the association(s), and any inclusions in the corresponding row of RAM 310 (step 614).

If N>W (step 616), process 600 then generates and stores one or more additional segments, as described below. Otherwise, process 600 is done (step 618).

If W or more characters remain in the pattern (step 620), process 600 generates a segment including the next W characters in the pattern (step 622), and stores the segment in a row of TCAM 306 (step 624). For example, for the pattern "filename", process 600 stores the segment "name", as shown in FIG. 4 at row four of TCAM 306. Process 600 then increments shift value S and stores S in the corresponding row of RAM 310 (step 626). Process 600 then resumes at step 620.

However, when fewer than W characters remain in the pattern (returning to step 620), then process 600 generates a segment including the last W characters of the pattern (step 628), and stores the segment in a row of TCAM 306 (step 630). For example, for the pattern "abcdef", process 600 stores the characters "cdef", as shown in FIG. 4 at row two of TCAM 306. Process 600 then increments shift value S and stores S in the corresponding row of RAM 310 (step 632). Then process 600 is done (step 634).

Figure 7:
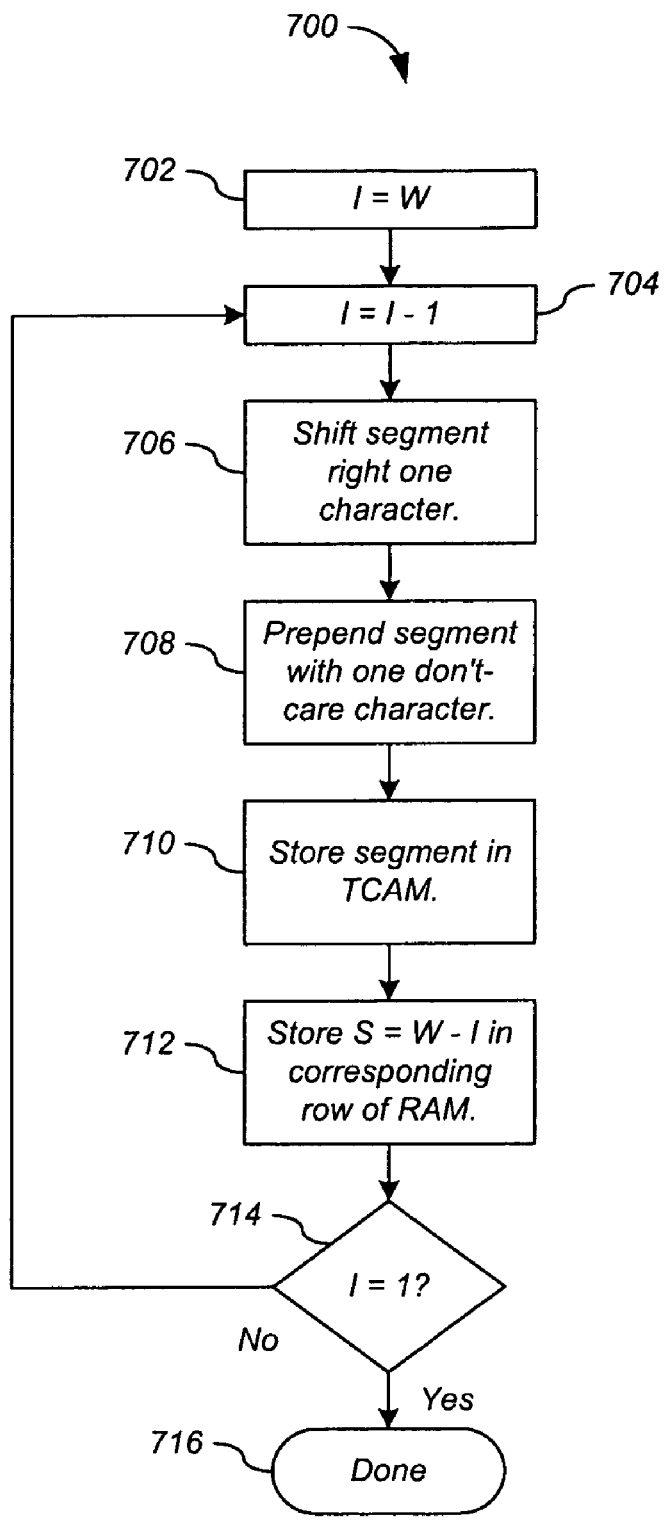
FIG. 7 shows a process for generating variations of a segment stored in the TCAM of FIG. 3 and storing the variations the TCAM according to a preferred embodiment of the present invention.

FIG. 7 shows a process 700 for generating variations of a segment stored in TCAM 306 and storing the variations in TCAM 306 according to a preferred embodiment of the present invention. Preferably variations are generated and stored for each segment generated and stored in TCAM 306 by process 600. That is, process stores W−1 variants of each of the segments in subsequent rows of the TCAM 306, comprising, for each of the segments, for W−1 cycles, shifting the segment to the right by one character, inserting a don't-care character as the first character of the segment, and storing the resulting segment in a row of TCAM 306. While process 700 is described with respect to the example of FIG. 4, process 700 is not limited by the example.

First, a counter I is set to the value of W, which is the width in characters of TCAM 306 (step 702). In the example of FIG. 4, W=4. Then counter I is decremented (step 704). The segment is shifted right by one character (step 706), and prepended with one don't-care character (step 708). Process 700 stores the resulting segment in a row of TCAM 306 (step 710), and stores a shift value S=W−1 in the corresponding row of RAM 310 (step 712). If I=1 (step 714), process 700 is done (step 716). Otherwise, process 700 resumes at step 704. For example, process 700 generates and stores the following variations of the segment "abcd": "?abc", "??ab", and "???a", and stores the shift values S=1, S=2, and S=3 in the corresponding rows of RAM 310, as shown in FIG. 4.

Figure 8:
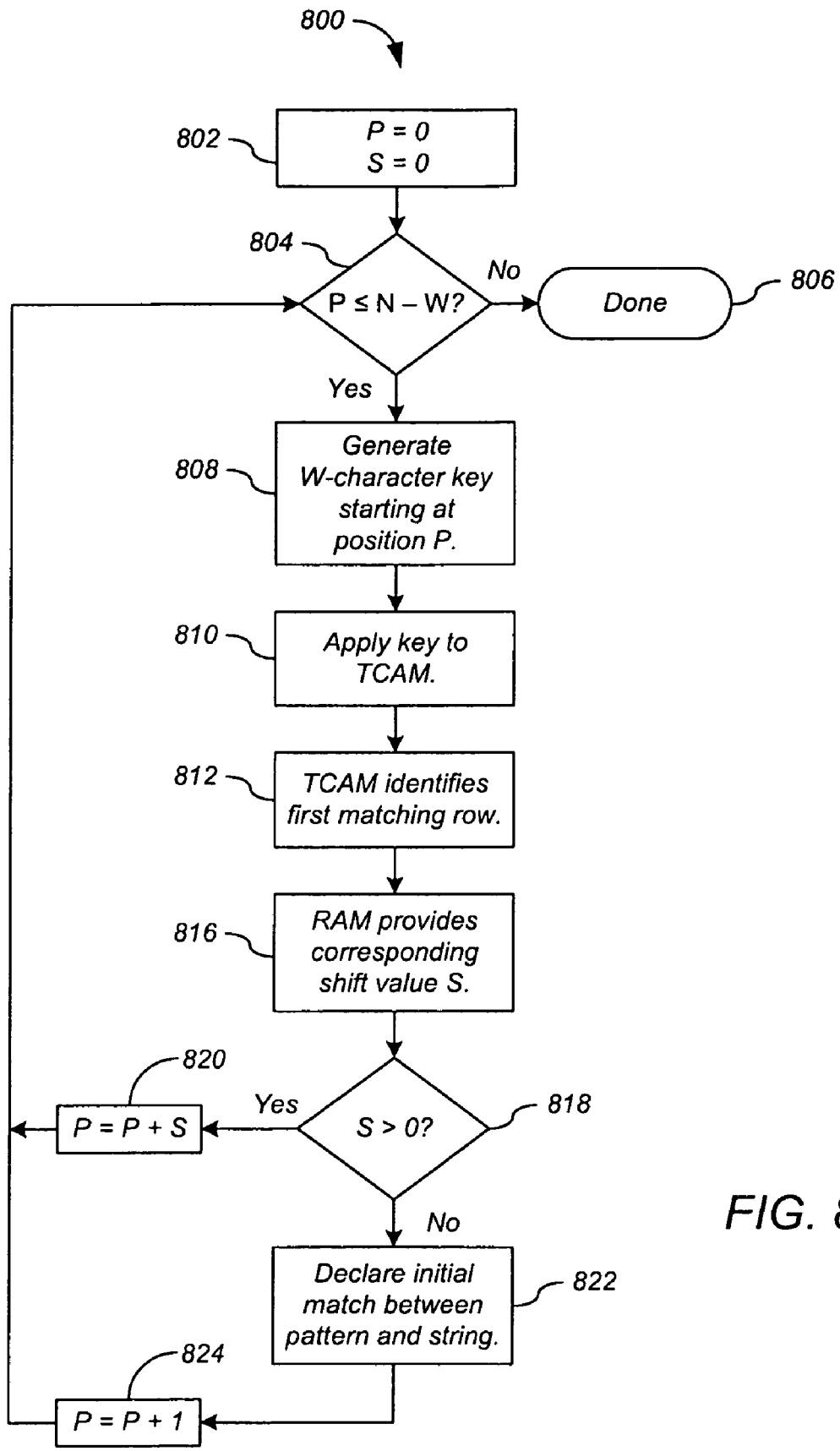
FIG. 8 shows a process for pattern matching according to a preferred embodiment of the present invention.

FIG. 8 shows a process 800 for pattern matching according to a preferred embodiment of the present invention. First, variables for the position P of the search within string 318, and for the current shift value S, are initialized to zero (step 802). If the number of characters in string 318 to be searched is less than the width W of TCAM 306, that is, P>N−W (step 804), then process 800 is done (step 806).

But while the number of characters in string 318 to be searched is greater than, or equal to, the width of TCAM 306, that is, P≦N−W, (step 804), process 800 continues. Controller 304 generates a key 308 of W characters starting at position P (step 808). In the example of FIG. 4, P=0, so the key "wwab" is generated.

Controller 304 applies key 308 to TCAM 306 (step 810). In response, TCAM 306 returns the identity of the first matching row (step 812), which is applied to RAM 310. In response, RAM 310 provides the corresponding shift value S to controller 304 (step 816).

If S>0 (step 818), indicating an initial match, controller 304 increases the search position P by the shift value S, that is, P=P+S (step 820), and resumes process 800 at step 804. This operation serves to place the matching characters at the beginning of the next key 308 generated, thereby increasing the efficiency of the search operation. In the example of FIG. 4, the first row of TCAM 306 to match the key "wwab" is the ninth row, which contains the segment "??ab", and which has a corresponding shift value of S=2. Therefore, the next key generated is "abcd".

When the shift value S for a matched row in TCAM 306 is zero (step 818), controller 304 declares an initial match (step 822) between the pattern and string 318. In the example of FIG. 4, the key "abcd", when applied to TCAM 306, matches the first row, which has a corresponding shift value of S=0. Therefore controller 304 declares an initial match, for example by asserting match signal 312. Controller 304 then increments position P by 1 (step 824), and resumes process 800 at step 804.

In some embodiments, controller 304 identifies the matching pattern when declaring an initial match. In these embodiments, RAM 310 includes associations for each pattern. In the example of FIG. 4, the segment "abcd" is associated with pattern 0="abcdef" and pattern 4="abcdarp".

Figure 9:
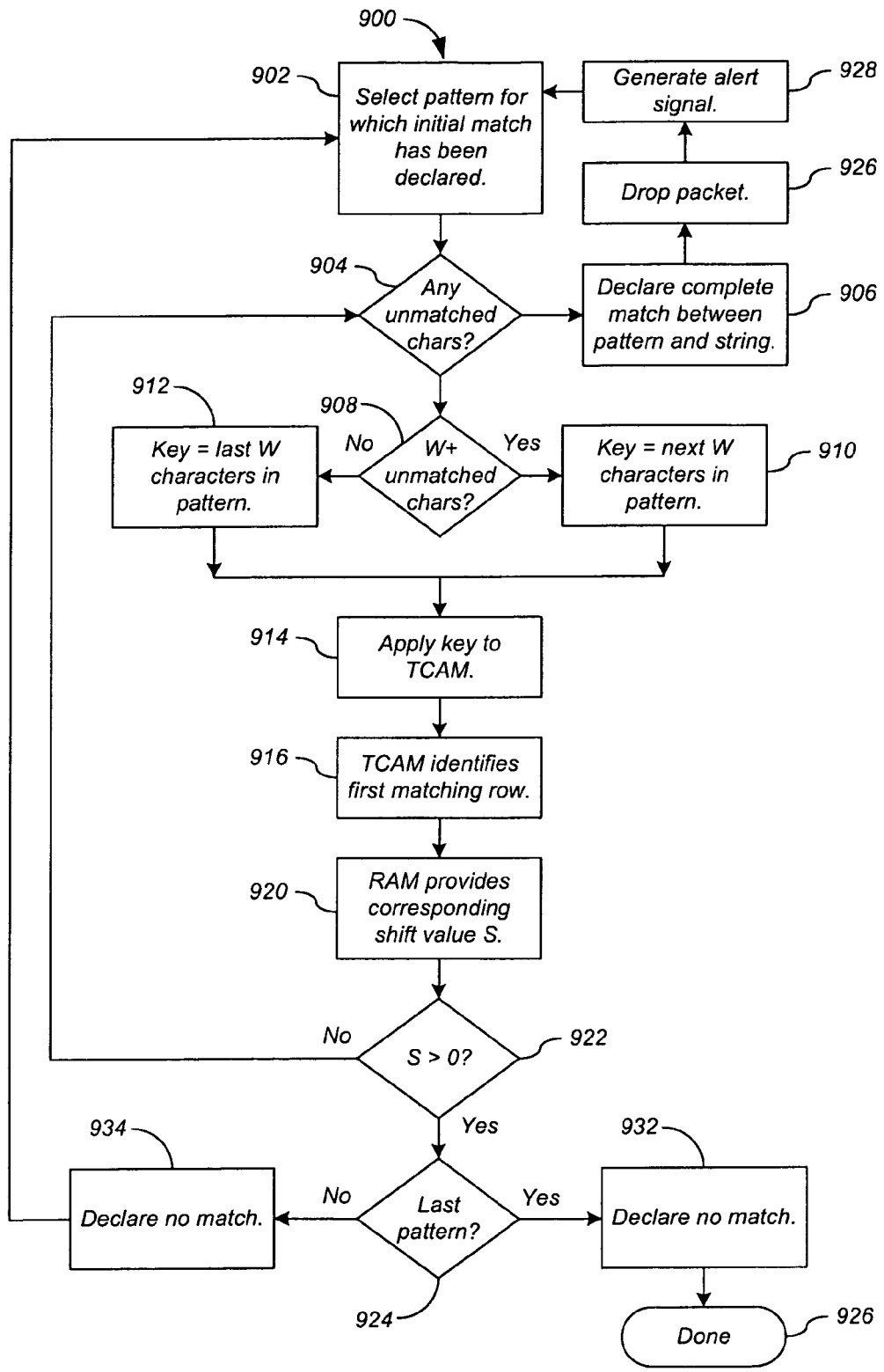
FIG. 9 shows a process for complete string matching following an initial match according to a preferred embodiment of the present invention.

In some embodiments, after declaring an initial match for one or more of the patterns, controller 304 goes on to determine whether any of the patterns has a complete match in a string 318. FIG. 9 shows a process 900 for complete string matching following an initial match according to a preferred embodiment of the present invention. First, controller 304 selects one of the patterns for which an initial match has been declared (step 902). In the example of FIG. 4, pattern 0="abcdef" is selected.

In embodiments that implement matching rules, the matching rule information for the pattern is used to constrain the matching for the pattern to one or more portions of string 318. In the example of FIG. 4, referring to Table 1, offset=−1 and depth=−1 for pattern 0, indicating no matching rule constraints for the pattern.

Controller 304 then determines whether any unmatched characters remain in the selected pattern (step 904). If not, then controller 304 declares a complete match between the pattern and string 318 (step 906), for example by asserting match signal 312, and resumes process 900 at step 902.

In some embodiments, alert circuit 322 generates an alert signal 326 in response to match signal 312 (step 928). In some embodiments, drop circuit 324 drops the corresponding packet 316 in response to match signal 312 (step 930).

But if any unmatched characters remain in the selected pattern, then controller 304 determines whether W or more unmatched characters remain in the selected pattern (step 908). If W or more unmatched characters remaining in the selected pattern, controller 304 generates a key 308 including the next W unmatched characters in the pattern (step 910). But if fewer than W unmatched characters remain in the selected pattern, controller 304 generate a key 308 including the last W characters in the pattern (step 912). In the example of FIG. 4, the number of unmatched characters is 2<W=4, so controller 304 generates the key "cdef", which are the last W characters pattern 0.

Controller 304 applies the key 308 to TCAM 306 (step 914). In response, TCAM 306 returns the identity of the first matching row (step 916), which is applied to RAM 310. In response, RAM 310 provides the corresponding shift value S to controller 304 (step 920).

If S>0 (step 922), the partial match is not complete for the pattern, so if there are no more partial pattern matches to be processed (step 924), controller 304 declares no match (step 932) and process 900 is done (step 926). But if there are more partial pattern matches to process (step 924), controller 304 declares no match (step 934) and selects the next pattern having an initial match (step 902), then resumes process 900 at step 904.

But if S=0 (step 922), indicating a match between key 308 and the pattern, controller 304 resumes process 900 at step 904. In the example of FIG. 4, the key "cdef" matches the second row of TCAM 306, which has a shift value of S=0. Because no unmatched characters remain in the pattern, controller 304 declares a complete match for the pattern.

Some embodiments maintain a Matched Patterns list to keep track of the patterns having completes matches in string 318. Some embodiments first check the Pattern List to ensure that the matching TCAM entries appear in the TPtrs list for the pattern. Table 2A shows a Matched Patterns list for the example of FIG. 4 after controller 304 declares a complete match for pattern 0 according to a preferred embodiment of the present invention.

TABLE 2A

| PatID | End Position |
|-------|--------------|
| 0     | 7            |

Referring to Table 2A, the Matched Patterns list includes a PatID column for the pattern ID of the matched patterns, and an End Position column to indicate the position in string 318 of the last character of each matched pattern. Table 2A indicates a complete match for pattern 0 ending at position 7 in string 318.

Embodiments implementing matching rules also maintain a Rules Table to determine when matching rules are satisfied. Table 3A shows a Rules Table for the example of FIG. 4 after controller 304 declares a complete match for pattern 0 according to a preferred embodiment of the present invention.

TABLE 3A

| RuleID | PatNum | PatIdxArray |
|--------|--------|-------------|
| 0      | 1      | 1,0         |

Referring to Table 3A, the Rules Table includes a RuleID column for the ID of each rule having a matched pattern, a PatNum column to record the number of patterns that have been matched for each rule, and a PatIDxArray column comprising a bit for each pattern in the rule. When a pattern is matched for a rule, the corresponding bit in the PatIDxArray column is set. When all the bits in the PatIDxArray column are set, the rule is satisfied. The rule can also define when the PatIDxArray bits are reset. For example, when the rules are Snort rules for a NIPS system, an attack is declared whenever a rule is satisfied. Table 3 indicates that one of two patterns has been matched for Rule 0.

Some embodiments also search for inclusions, that is, patterns that are included within other patterns. In the example of FIG. 4, pattern 2="ab" is included within pattern 0="abcdef" and pattern 4="abcdarp", and so the first row of TCAM 306, which contains the segment "abcd" has a corresponding entry in RAM 310 that indicates pattern 2 as an inclusion. Controller 304 therefore checks pattern 2 for a match. However, pattern 2 has an offset=8, and so does not match.

Continuing the example of FIG. 4 for embodiments implementing matching rules, controller 304 increments position P by 1 (FIG. 8, step 824), and generates the key "bcde" (step 808). When applied to TCAM 306, key "bcde" matches only the last row, which has a shift value of S=4. Therefore controller 304 increments position P by 4 (step 820), and generates the key "ftxy" (step 808). When applied to TCAM 306, key "ftxy" matches the 20$^{th}$ row containing the segment "??xy", which has a shift value of S=2. Therefore controller 304 increments position P by 2 (step 820), and generates the key "xyza" (step 808). When applied to TCAM 306, key "xyza" matches the sixth row containing the segment "xyz?", which has a shift value of S=0 and an association with pattern 1="xyz". Therefore, controller 304 declares an initial match (step 822). After declaring a complete match, controller 304 adds pattern 1 to the matched patterns list, which is shown below as Table 2B, then indicates a complete match for pattern 1 ending at position 11 in string 318.

TABLE 2B

| PatID | End Position |
|-------|--------------|
| 0     | 7            |
| 1     | 11           |

Controller 304 also updates the Rules Table, which as shown below as Table 3B indicates that both patterns for Rule 0 have been matched.

TABLE 3B

| RuleID | PatNum | PatIdxArray |
|--------|--------|-------------|
| 0      | 2      | 1,1         |

Pattern 1 is not a root pattern, that is, pattern 1 is not the first pattern in a rule (referring to Table 1, root=false for pattern 1). Therefore controller 304 checks the Matched Patterns list to see whether the first pattern in the rule has been matched. Here, that pattern is pattern 0, which has been matched. Further, pattern 0 and pattern 1 occur within five characters of each other in string 318. Therefore, Rule 0 is satisfied. In a NIPS implementation, an attack alert is then declared.

Continuing the example of FIG. 4 for embodiments implementing matching rules, controller 304 increments position P by 1 (FIG. 8, step 824), and therefore generates the key "yzab" (step 808), which when applied to TCAM 306, matches the ninth row, which has a shift value of S=2. Therefore controller 304 increments position P by 2 (step 820), and generates the key "abcd" (step 808), which when applied to TCAM 306, matches the first row containing the segment "abcd", which has a shift value of S=0 and associations with pattern 0="abcdef" and pattern 4="abcdarp". Therefore, controller 304 declares partial matches for pattern 0 and pattern 4 (step 822).

For pattern 0, process 900 of FIG. 9 then generates the key "cdef" (step 912) which results in a shift value of S>0 (step 922), indicating the match is not complete. For pattern 4, process 900 of FIG. 9 then generates the key "darp" (step 912) which results in a shift value of S=0 (step 922), indicating a complete match, which controller 304 declares (step 906).

Controller 304 adds pattern 4 to the matched patterns list, which as shown below as Table 2C, then indicates a complete match for pattern 4 ending at position 18 in string 318.

TABLE 2C

| PatID | End Position |
|---|---|
| 0 | 7 |
| 1 | 11 |
| 4 | 18 |

Controller 304 also updates the Rules Table, which as shown below as Table 3C indicates that the pattern for Rule 2 has been matched.

TABLE 3C

| RulerID | PatNum | PatIdxArray |
|---|---|---|
| 0 | 2 | 1,1 |
| 2 | 1 | 1 |

Pattern 4 has a constraint depth=25, but the match occurs within the first 25 characters of string 318, so the constraint is satisfied. Pattern 4 is also the only pattern in Rule 2, so Rule 2 is satisfied. In a NIPS implementation, an attack alert is then declared.

Figure 10B:
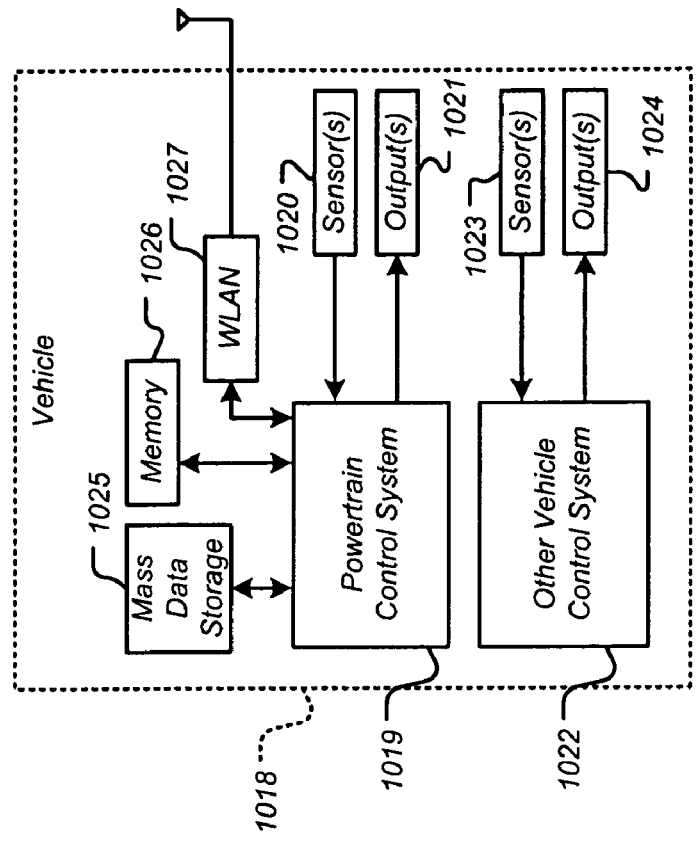
FIGS. 10A-10E show various exemplary implementations of the present invention.
Figure 10A:
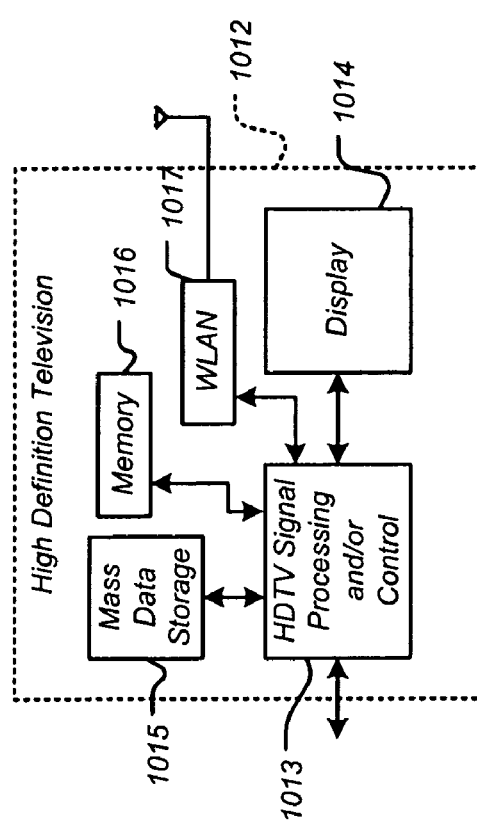

FIGS. 10A-10E show various exemplary implementations of the present invention. Referring now to FIG. 10A, the present invention can be implemented in a high definition television (HDTV) 1012. The present invention may implement either or both signal processing and/or control circuits, which are generally identified in FIG. 10A at 1013, a WLAN interface and/or mass data storage of the HDTV 1012. The HDTV 1012 receives HDTV input signals in either a wired or wireless format and generates HDTV output signals for a display 1014. In some implementations, signal processing circuit and/or control circuit 1013 and/or other circuits (not shown) of the HDTV 1012 may process data, perform coding and/or encryption, perform calculations, format data and/or perform any other type of HDTV processing that may be required.

The HDTV 1012 may communicate with mass data storage 1015 that stores data in a nonvolatile manner such as optical and/or magnetic storage devices. The HDD may be a mini HDD that includes one or more platters having a diameter that is smaller than approximately 1.8". The HDTV 1012 may be connected to memory 1016 such as RAM, ROM, low latency nonvolatile memory such as flash memory and/or other suitable electronic data storage. The HDTV 1012 also may support connections with a WLAN via a WLAN network interface 1017.

Referring now to FIG. 10B, the present invention implements a control system of a vehicle 1018, a WLAN interface and/or mass data storage of the vehicle control system. In some implementations, the present invention implements a powertrain control system 1019 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1022 of the vehicle 1018. The control system 1022 may likewise receive signals from input sensors 1023 and/or output control signals to one or more output devices 1024. In some implementations, the control system 1022 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1019 may communicate with mass data storage 1025 that stores data in a nonvolatile manner. The mass data storage 1025 may include optical and/or magnetic storage devices for example hard disk drives HDD and/or DVDs. The HDD may be a mini HDD that includes one or more platters having a diameter that is smaller than approximately 1.8". The powertrain control system 1019 may be connected to memory 1026 such as RAM, ROM, low latency nonvolatile memory such as flash memory and/or other suitable electronic data storage. The powertrain control system 1019 also may support connections with a WLAN via a WLAN network interface 1027. The control system 1022 may also include mass data storage, memory and/or a WLAN interface (all not shown).

Figure 10C:
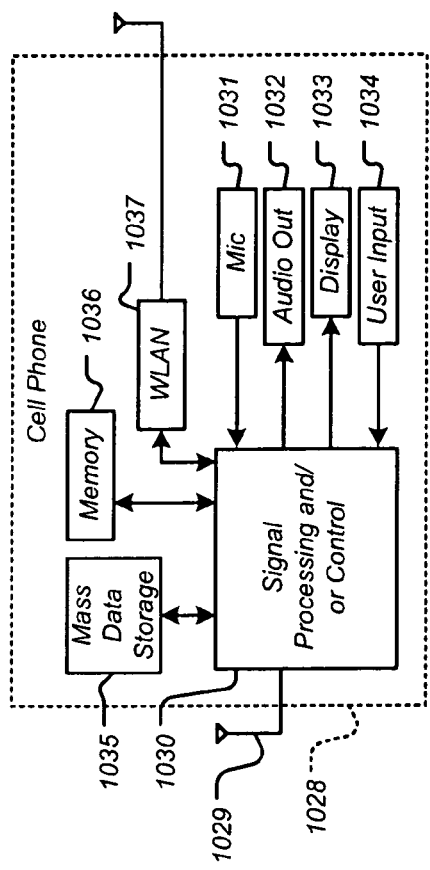

Referring now to FIG. 10C, the present invention can be implemented in a cellular phone 1028 that may include a cellular antenna 1029. The present invention may implement either or both signal processing and/or control circuits, which are generally identified in FIG. 10C at 1030, a WLAN interface and/or mass data storage of the cellular phone 1028. In some implementations, the cellular phone 1028 includes a microphone 1031, an audio output 1032 such as a speaker and/or audio output jack, a display 1033 and/or an input device 1034 such as a keypad, pointing device, voice actuation and/or other input device. The signal processing and/or control circuits 1030 and/or other circuits (not shown) in the cellular phone 1028 may process data, perform coding and/or encryption, perform calculations, format data and/or perform other cellular phone functions.

The cellular phone 1028 may communicate with mass data storage 1035 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1028 may be connected to memory 1036 such as RAM, ROM, low latency nonvolatile memory such as flash memory and/or other suitable electronic data storage. The cellular phone 1028 also may support connections with a WLAN via a WLAN network interface 1037.

Figure 10D:
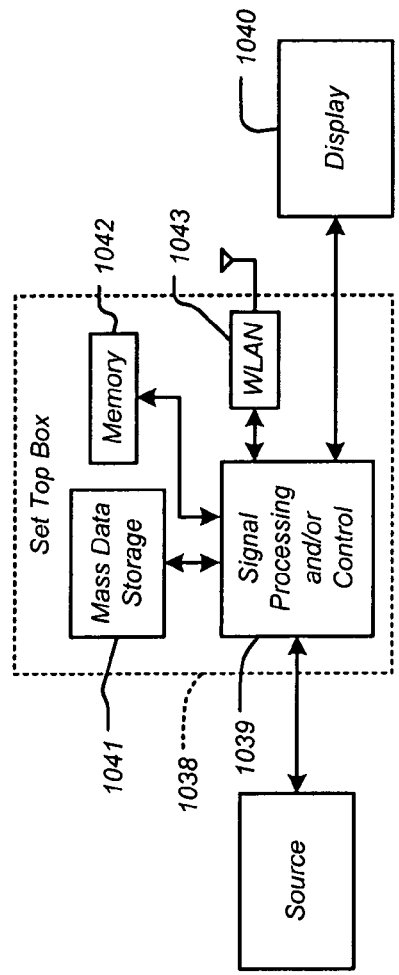

Referring now to FIG. 10D, the present invention can be implemented in a set top box 1038. The present invention may implement either or both signal processing and/or control circuits, which are generally identified in FIG. 10D at 1039, a WLAN interface and/or mass data storage of the set top box 1038. The set top box 1038 receives signals from a source such as a broadband source and outputs standard and/or high definition audio/video signals suitable for a display 1040 such as a television and/or monitor and/or other video and/or audio output devices. The signal processing and/or control circuits 1039 and/or other circuits (not shown) of the set top box 1038 may process data, perform coding and/or encryption, perform calculations, format data and/or perform any other set top box function.

The set top box 1038 may communicate with mass data storage 1041 that stores data in a nonvolatile manner. The mass data storage 1041 may include optical and/or magnetic storage devices for example hard disk drives HDD and/or DVDs. The HDD may be a mini HDD that includes one or more platters having a diameter that is smaller than approximately 1.8". The set top box 1038 may be connected to memory 1042 such as RAM, ROM, low latency nonvolatile memory such as flash memory and/or other suitable electronic data storage. The set top box 1038 also may support connections with a WLAN via a WLAN network interface 1043.

Figure 10E:
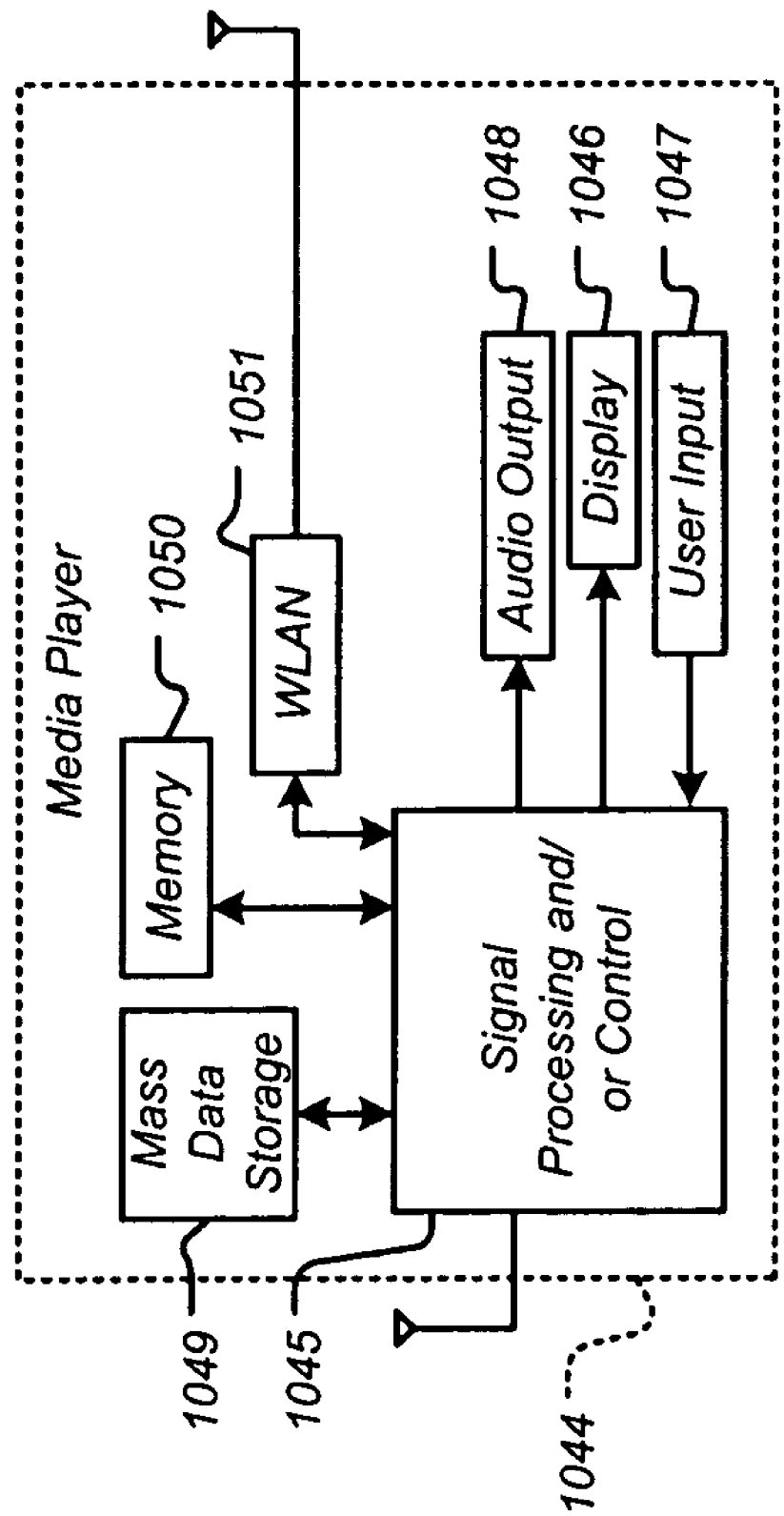

Referring now to FIG. 10E, the present invention can be implemented in a media player 1044. The present invention may implement either or both signal processing and/or control circuits, which are generally identified in FIG. 10E at 1045, a WLAN interface and/or mass data storage of the media player 1044. In some implementations, the media player 1044 includes a display 1046 and/or a user input 1047 such as a keypad, touchpad and the like. In some implementations, the media player 1044 may employ a graphical user interface (GUI) that typically employs menus, drop down menus, icons and/or a point-and-click interface via the display 1046 and/or user input 1047. The media player 1044 further includes an audio output 1048 such as a speaker and/or audio output jack. The signal processing and/or control circuits 1045 and/or other circuits (not shown) of the media player 1044 may process data, perform coding and/or encryption, perform calculations, format data and/or perform any other media player function.

The media player 1044 may communicate with mass data storage 1049 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1044 may be connected to memory 1050 such as RAM, ROM, low latency nonvolatile memory such as flash memory and/or other suitable electronic data storage. The media player 1044 also may support connections with a WLAN via a WLAN network interface 1051. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for detecting a pattern in a string, wherein the pattern and the string each comprise one or more characters selected from a finite set of the one or more characters, wherein the string is N characters in length and the pattern is M characters in length, and wherein $N \geq M$, the apparatus comprising:

a ternary content-addressable memory (TCAM) comprising a first plurality of rows each storing a segment comprising W−S consecutive ones of the M characters in the pattern preceded by S don't-care characters, wherein $zero \geq S < W$;

a random-access memory to store a value of S for each of the first plurality of rows of the TCAM; and a controller to generate keys based on the string, wherein each of the keys includes consecutive ones of the N characters in a window of W characters of the string, the controller to apply the keys to the TCAM, wherein, when the TCAM returns a first matching row having a shift of S>zero in response to a first of the keys, the controller shifts the window right S places and generates a second of the keys including the consecutive ones of the N characters in the window that was shifted, wherein, when the TCAM returns a second matching row having a shift of S=zero, the controller declares a first initial match between the pattern and the string, wherein after the controller declares the first initial match between the pattern and the string, and when N>W, (a) the controller shifts the window right W places and generates the second of the keys including the consecutive ones of the N characters in the window that was shifted, (b) the controller applies the second of the keys to the TCAM, (c) wherein, when the TCAM returns the first matching row having a shift of S>zero, the controller declares no match between the pattern and the string, (d) wherein, when the TCAM returns the second matching row having a shift of S=zero, the controller repeats (a) through (c) until all of the M characters of the pattern have been applied to the TCAM, (e) when all keys in (a) through (d) return a shift of S=zero, the controller declares a complete match between the pattern and the string, and wherein S is an integer greater than or equal to zero, and M, W and N are integers greater than or equal to 1.

2. The apparatus of claim 1, wherein the TCAM further comprises:

a second row following the first plurality of rows, wherein the second row stores W don't-care characters; and wherein the random-access memory stores the value S=W for the second row of the TCAM.

3. The apparatus of claim 1:

wherein the controller, after declaring the first initial match between the pattern and the string, declares a complete match between the pattern and the string when $N \leq W$.

4. The apparatus of claim 1:
wherein the TCAM stores segments associated with at least one further pattern;
wherein the random-access memory stores an association between each of the first plurality of rows of the TCAM and an identifier of the pattern associated with the segment stored in one of the first plurality of rows of the TCAM; and
wherein the controller declares the identifier for the pattern when declaring the first initial match between the pattern and the string.

5. The apparatus of claim 1:
wherein, when the pattern comprises a constraint that identifies one or more portions of the string, the controller declares the first initial match between the pattern and the string only when the pattern is found in the one or more portions of the string.

6. The apparatus of claim 1:
wherein, when one segment for the pattern comprises one or more second patterns, the random-access memory stores an association between the row of the TCAM storing the one segment and identifiers of the one or more second patterns; and
wherein, when the controller declares the first initial match between the pattern and the string, the controller declares a second initial match between the one or more second patterns and the string.

7. The apparatus of claim 1, further comprising:
an input circuit to receive packets of data, wherein the string represents some or all of the data.

8. The apparatus of claim 7, further comprising:
an alert circuit to declare an attack when the controller indicates a complete match between the pattern and the string.

9. The apparatus of claim 7, further comprising:
a drop circuit to drop one or more of the packets when the controller indicates a complete match between the pattern and the string.

10. A network device comprising the apparatus of claim 7.

11. The network device of claim 10, wherein the network device is selected from the group consisting of:
a network switch;
a router; and
a network interface controller.

12. An apparatus for detecting a pattern in a string, wherein the pattern and the string each comprise one or more characters selected from a finite set of the one or more characters, wherein the string is N characters in length and the pattern is M characters in length, wherein $N \geq M$, the apparatus comprising:
ternary content-addressable memory (TCAM) means comprising a first plurality of row means each for storing a segment comprising W–S consecutive ones of the M characters in the pattern preceded by S don't-care characters, wherein $zero \leq S < W$;
random-access memory means for storing a value of S for each of the first plurality of row means of the TCAM means; and
controller means for generating keys based on the string, wherein each of the keys includes consecutive ones of the N characters in a window of W characters of the string, the controller means applies the keys to the TCAM means,
wherein, when the TCAM means returns a first matching row means having a shift of S>zero in response to a first of the keys, the controller means shifts the window right S places and generates a second of the keys including the consecutive ones of the N characters in the window that was shifted,
wherein, when the TCAM means returns a second matching row means having a shift of S=zero, the controller means declares a first initial match between the pattern and the string,
wherein after the controller means declares the first initial match between the pattern and the string, and when N>W,
(a) the controller means shifts the window right W places and generates the second of the keys including the consecutive ones of the N characters in the window that was shifted,
(b) the controller means applies the second of the keys to the TCAM means,
(c) wherein, when the TCAM means returns the first matching row means having a shift of S>zero, the controller means declares no match between the pattern and the string,
(d) wherein, when the TCAM means returns the second matching row means having a shift of S=zero, the controller means repeats (a) through (c) until all of the M characters of the pattern have been applied to the TCAM means,
(e) when all keys in (a) through (d) return a shift of S=zero, the controller means declares a complete match between the pattern and the string, and
wherein S is an integer greater than or equal to zero, and M, W and N are integers greater than or equal to 1.

13. The apparatus of claim 12, wherein the TCAM means further comprises:
second row means, following the plurality of first row means, for storing W don't-care characters; and wherein the random-access memory means stores the value S=W for the second row means of the TCAM means.

14. The apparatus of claim 12:
wherein the controller means, after declaring the first initial match between the pattern and the string, declares a complete match between the pattern and the string when $N \leq W$.

15. The apparatus of claim 13:
wherein the TCAM means stores segments associated with at least one further pattern;
wherein the random-access memory means stores an association between each of the first plurality of row means of the TCAM means and an identifier of the pattern associated with a segment stored in one of the first plurality of row means of the TCAM means; and
wherein the controller means declares the identifier for the pattern when declaring the first initial match between the pattern and the string.

16. The apparatus of claim 12:
wherein, when the pattern comprises a constraint that identifies one or more portions of the string, the controller means declares the first initial match between the pattern and the string only when the pattern is found in the one or more portions of the string.

17. The apparatus of claim 12:
wherein, when one segment for the pattern comprises one or more second patterns, the random-access memory means stores an association between the row means of the TCAM means storing the one segment and identifiers of the one or more second patterns; and wherein, when the controller means declares the first initial match between the pattern and the string, the controller means declares a second initial match between the one or more second patterns and the string.

18. The apparatus of claim 12, further comprising:

input means for receiving packets of data, wherein the string represents some or all of the data.

19. The apparatus of claim 18, further comprising:

alert means for declaring an attack when the controller means indicates a complete match between the pattern and the string.

20. The apparatus of claim 18, further comprising:

drop means for dropping one or more of the packets when the controller means indicates the first initial match between the pattern and the string.

21. A network device comprising the apparatus of claim 18.

22. The network device of claim 21, wherein the network device is selected from the group consisting of:

a network switch;

a router; and a network interface controller.

\* \* \* \* \*